United States Patent
Shindo (12)

(10) Patent No.: US 10,652,507 B2
(45) Date of Patent: May 12, 2020

(54) DISPLAY SYSTEM, IMAGE PROCESSING APPARATUS, AND DISPLAY METHOD

(71) Applicant: SEIKO EPSON CORPORATION, Tokyo (JP)

(72) Inventor: Takashi Shindo, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/203,165

(22) Filed: Nov. 28, 2018

(65) Prior Publication Data

US 2019/0166336 A1 May 30, 2019

(30) Foreign Application Priority Data

Nov. 29, 2017 (JP) ................. 2017-228721

(51) Int. Cl.
*H04N 9/31* (2006.01)
*G06F 3/14* (2006.01)
*H04N 7/01* (2006.01)
*G09G 3/00* (2006.01)

(52) U.S. Cl.
CPC ......... *H04N 9/3147* (2013.01); *G06F 3/1446* (2013.01); *H04N 7/0125* (2013.01); *H04N 7/0127* (2013.01); *H04N 9/3179* (2013.01); *H04N 9/3185* (2013.01); *H04N 9/3188* (2013.01); *G09G 3/002* (2013.01); *G09G 2300/026* (2013.01); *G09G 2340/0435* (2013.01); *G09G 2370/04* (2013.01); *G09G 2370/12* (2013.01)

(58) Field of Classification Search
CPC .. H04N 9/3147; H04N 9/3179; H04N 9/3185; H04N 7/0127; H04N 7/0125; H04N 9/3188; G06F 3/1446; G09G 2370/12; G09G 3/002; G09G 2370/04; G09G 2300/026; G09G 2340/0435
See application file for complete search history.

(56) References Cited

U.S. PATENT DOCUMENTS

| 2008/0216125 | A1* | 9/2008 | Li .................. H04N 21/4122 725/62 |
| 2013/0141475 | A1 | 6/2013 | Kotani |
| 2017/0048484 | A1 | 2/2017 | Kondo |

FOREIGN PATENT DOCUMENTS

| JP | 2008-216805 A | 9/2008 |
| JP | 2013-117631 A | 6/2013 |
| JP | 2015-169940 A | 9/2015 |
| JP | 2015-211229 A | 11/2015 |

* cited by examiner

*Primary Examiner* — Andrew Sasinowski
(74) *Attorney, Agent, or Firm* — Oliff PLC

(57) ABSTRACT

A projector includes a division processing section that generates a plurality of partial frames each containing at least part of a frame of source image data and an image output section that outputs the plurality of generated partial frames to downstream projectors in an order set in advance. The downstream projectors each include an image input section to which the plurality of generated partial frames are inputted from the higher-level projector and a control section that selects a partial frame to be displayed based on the input order of the partial frames inputted to the image input section and causes a display section to display the selected partial frame.

10 Claims, 9 Drawing Sheets

DISPLAY SYSTEM, IMAGE PROCESSING APPARATUS, AND DISPLAY METHOD

BACKGROUND

1. Technical Field

The present invention relates to a display system, a display apparatus, an image processing apparatus, and a display method.

2. Related Art

There is a known display system in which a plurality of display apparatuses display images (see JP-A-2008-216805, for example). JP-A-2008-216805 discloses an image projection system which includes a master projector and slave projectors and in which the master projector divides a video signal supplied from an image supply apparatus to produce divided video signals and supplies the slave projectors with the divided video signals having been produced.

In recent years, the resolution of an image displayed by a display apparatus tends to gradually increase, and the processing performance required for a display system increases accordingly. For example, in a case where a display system including display apparatuses each having low processing performance displays an image, and the display apparatuses each process a high-resolution image, a display apparatus having high processing performance needs to wait completion of the process executed by each of the display apparatuses having low processing performance before displaying the image. Therefore, the timing when an image is displayed by the display system as a whole is undesirably delayed. To solve the problem, all the display apparatuses contained in the display system only need to have high processing performance. In this case, however, the scale and complexity of the circuit configuration of each of the display apparatus undesirably increase.

To synchronize the display timings of the plurality of display apparatuses with one another, the display timing of each of the display apparatuses needs to be controlled, and simplification of the circuit configuration for the display timing control is also required.

SUMMARY

An advantage of some aspects of the invention is to achieve a display system in which a plurality of display apparatuses display high-resolution images but portions that occupy the majority of a processing circuit of each of the display apparatuses can use a circuit configuration having low processing performance, whereby the display system can be formed of display apparatuses each having a simple circuit configuration.

An aspect of the invention is directed to a display system including a first display apparatus and a second display apparatus. The first display apparatus includes a first display section that displays an image, a first input section to which a source image is inputted, a frame generation section that generates a plurality of partial frames each containing at least part of a frame of the source image, an output section that outputs the plurality of partial frames generated by the frame generation section to the second display apparatus in an order set in advance, and a first display control section that causes the first display section to display any of the partial frames generated by the frame generation section. The second display apparatus includes a second display section that displays an image, a second input section to which the partial frames are inputted from the first display apparatus, and a second display control section that selects one of the partial frames to be displayed by the second display section based on an input order of the partial frames inputted to the second input section and causes the second display section to display the selected partial frame.

According to the configuration described above, since the first display apparatus generates a plurality of partial frames and sends the partial frames to the second display apparatus, the second display apparatus does not need to generate partial frames. A low-processing-performance circuit configuration can therefore be used in many portions of the processing circuit of the second display apparatus. A display apparatus having a simple circuit configuration can thus be achieved.

The first display apparatus sends the partial frames in the order set in advance, and the second display apparatus selects, based on the input order of the partial frames inputted to the second input section, a partial frame to be displayed. The partial frame to be displayed by the second display apparatus can therefore be selected from the plurality of partial frames received from the first display apparatus.

In the aspect of the invention, a plurality of the second display apparatuses may be connected to the first display apparatus in daisy chain connection.

According to the configuration described above, in the display system in which the first display apparatus is daisy-chained to the plurality of second display apparatuses, the second display apparatuses can each select a partial frame to be displayed from the plurality of received partial frames.

In the aspect of the invention, the frame generation section may take the plurality of partial frames from one frame that forms the source image to generate the plurality of partial frames, and the output section may continuously output the plurality of partial frames generated from the one frame of the source image.

According to the configuration described above, the first display apparatus and the second display apparatuses can display the plurality of partial frames generated from one frame that forms the source image.

In the aspect of the invention, the output section may add identification data to a head of any of the plurality of partial frames generated from the one frame of the source image and output the partial frame with the identification data.

According to the configuration described above, the positions of the plurality of partial frames in the source image can be identified based on the identification data.

In the aspect of the invention, the second display apparatuses may each include a storage section that stores information on the number of frames after the head partial frame is inputted to the second input section but by the time when the partial frame to be displayed by the second display section is inputted. The second display control section may count the number of partial frames inputted to the second input section after the partial frame to which the identification data has been added is inputted to the second input section, and when the count coincides with the information on the number of frames stored in the storage section, the second display control section may select the partial frame inputted to the second input section as the partial frame to be displayed by the second display section.

According to the configuration described above, the amount of information notified from the first display apparatus to the second display apparatuses is be reduced, and the small amount of information allows the second display apparatuses to each select a partial frame to be displayed from the plurality of received partial frames.

In the aspect of the invention, the output section may add a vertical sync signal to the head of each of the plurality of partial frames generated from the one frame of the source image, and the second display control sections may cause the second display sections to display the selected partial frames in synchronization with timings when the vertical sync signals added to the partial frames are inputted to the second input sections.

According to the configuration described above, the easy, simple circuit configuration described above allows the timings when the first display apparatus and the second display apparatuses display the partial frames generated from the one frame of the source image to synchronize with one another.

In the aspect of the invention, the frame generation section may generate the partial frames, the number of which corresponds to the first display apparatus and the plurality of second display apparatuses, from the one frame of the source image.

According to the configuration described above, the one frame of the source image can be divided and displayed by the first display apparatus and the plurality of second display apparatuses.

In the aspect of the invention, the output section may output the plurality of partial frames generated from the one frame of the source image in a cycle corresponding to a cycle in which the one frame of the source image is transmitted.

According to the configuration described above, the plurality of partial frames can be transmitted to each of the second display apparatuses in the cycle in which the one frame of the source image is transmitted.

In the aspect of the invention, the frame generation section may generate the partial frames each having resolution lower than resolution of the one frame that forms the source image.

According to the configuration described above, the source image can be divided into a plurality of partial frames each having resolution lower than that of the source image.

In the aspect of the invention, the output section may output the plurality of partial frames in the chronological order in accordance with connection ranking in the daisy chain connection.

According to the configuration described above, the second display apparatuses can select the partial frames to be displayed by the second display sections from the plurality of partial frames received from the first display apparatus in accordance with the connection ranking in the daisy chain connection.

Another aspect of the invention is directed to A display system including an image processing apparatus and a display apparatus connected to the image processing apparatus. The image processing apparatus includes a frame generation section that generates a plurality of partial frames each containing at least part of a frame of a source image and an output section that outputs the plurality of partial frames generated by the frame generation section to the display apparatus in an order set in advance, and the display apparatus includes a display section that displays an image, a second input section to which the partial frames are inputted from the image processing apparatus, and a display control section that selects one of the partial frames to be displayed by the display section based on an input order of the partial frames inputted to the second input section and causes the display section to display the selected partial frame.

According to the configuration described above, since the image processing apparatus generates a plurality of partial frames and sends the partial frames to the display apparatus, the display apparatus does not need to generate partial frames. A low-processing-performance circuit configuration can therefore be used in many portions of the processing circuit of the display apparatus. A display apparatus having a simple circuit configuration can thus be achieved.

The image processing apparatus sends the partial frames in the order set in advance, and the display apparatus selects, based on the input order of the partial frames inputted to the second input section, a partial frame to be displayed. The partial frame to be displayed by the display apparatus can therefore be selected from the plurality of partial frames received from the image processing apparatus.

Another aspect of the invention is directed to a display apparatus connected to an external display apparatus, the display apparatus including a display section that displays an image, an input section to which a source image is inputted, a frame generation section that takes a partial frame containing at least part of one frame that forms the source image inputted to the input section to generate a plurality of the partial images, an output section that outputs the plurality of partial frames generated by the frame generation section from the one frame of the source image to the external display apparatus in an order set in advance, and a display control section that causes the display section to display any of the partial frames generated by the frame generation section from the one frame of the source image.

According to the configuration described above, since the display apparatus generates a plurality of partial frames and sends the partial frames to the external display apparatus, the external display apparatus does not need to generate partial frames. A low-processing-performance circuit configuration can therefore be used in many portions of the processing circuit of the external display apparatus. A display apparatus having a simple circuit configuration can thus be achieved.

The display apparatus sends the partial frames in the order set in advance, and the external display apparatus can select a partial frame to be displayed. The external display apparatus can therefore select a partial frame to be displayed by the external display apparatus from the plurality of partial frames received from the display apparatus.

Another aspect of the invention is directed to an image processing apparatus connected to an external display apparatus, the image processing apparatus including a frame generation section that takes a partial frame from one frame that forms a source image in such away that the partial frame contains at least part of the one frame of the source image to generate a plurality of the partial frames and an output section that outputs the plurality of partial frames generated by the frame generation section from the one frame of the source image to the external display apparatus in an order set in advance.

According to the configuration described above, since the image processing apparatus generates a plurality of partial frames and sends the partial frames to the external display apparatus, the external display apparatus does not need to generate partial frames. A low-processing-performance circuit configuration can therefore be used in many portions of the processing circuit of the external display apparatus. A display apparatus having a simple circuit configuration can thus be achieved.

Another aspect of the invention is directed to a display method for displaying a source image by a plurality of display apparatuses connected to each other in daisy chain connection, the method including generating a plurality of partial frames from one frame of the source image in such a way that the partial frames each contain at least part of the one frame of the source image, transmitting the plurality of partial frames generated from the one frame of the source image in an order set in advance to the plurality of display apparatuses, and causing the plurality of display apparatuses to each select one of the partial frames to be displayed by the display apparatus based on an input order of the plurality of partial frames generated from the one frame of the source image and display the selected partial frames.

According to the configuration described above, since a plurality of partial frames are generated and sent to the display apparatuses, the display apparatuses do not need to generate partial frames. A low-processing-performance circuit configuration can therefore be used in many portions of the processing circuit of each of the display apparatuses. Display apparatuses each having a simple circuit configuration can thus be achieved.

The partial frames are sent in the order set in advance, and the display apparatuses each select, based on the input order of the partial frames, a partial frame to be displayed. The display apparatuses can therefore select a partial frame to be displayed by the display apparatus from the plurality of received partial frames.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the accompanying drawings.

Figure 1:
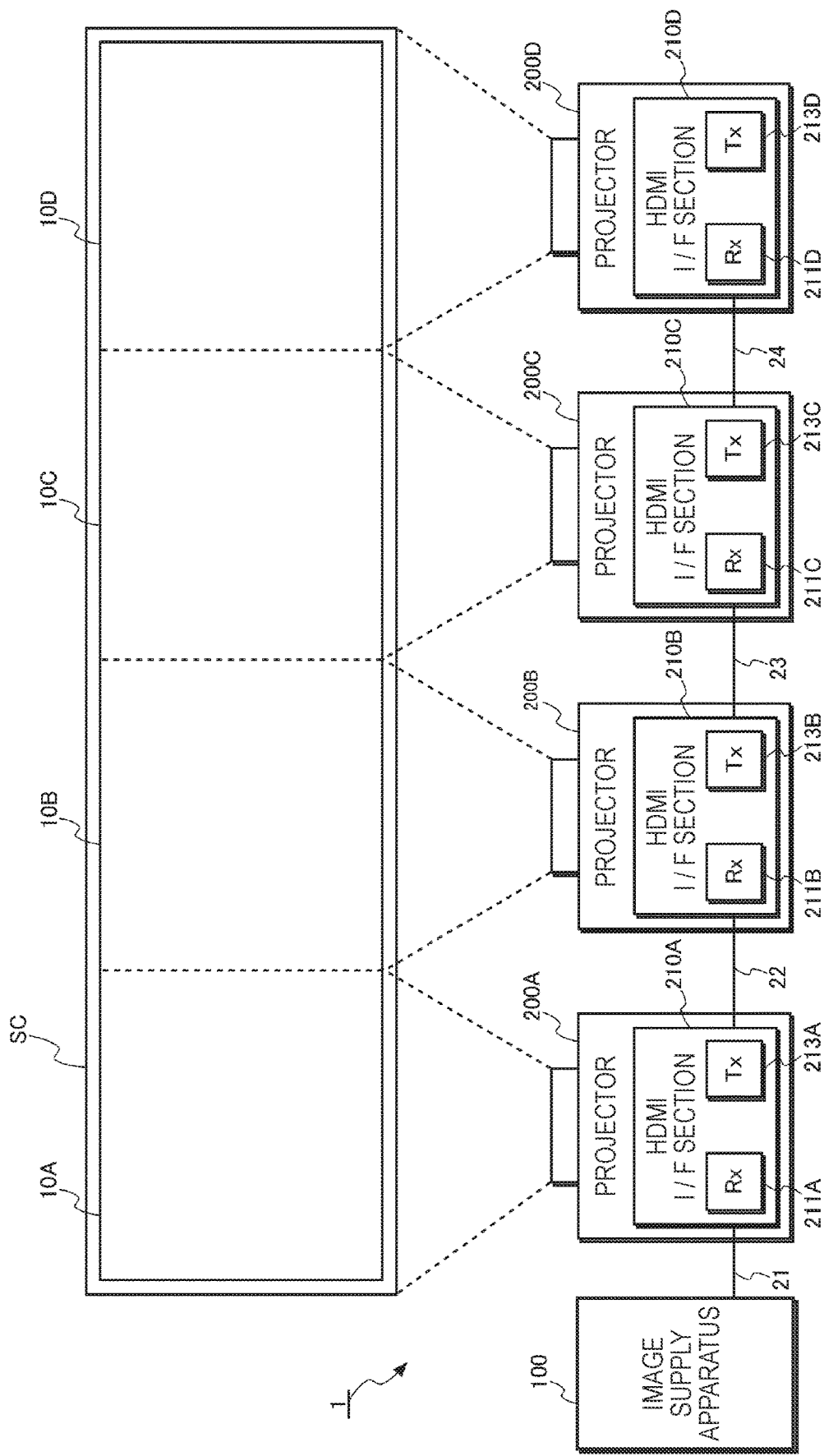
FIG. 1 is a system configuration diagram of a display system.

FIG. 1 is a system configuration diagram of a display system 1 to which the invention is applied. The display system 1 according to the present embodiment, includes an image supply apparatus 100 and a plurality of projectors 200. The image supply apparatus 100 supplies image data to be projected by the plurality of projectors 200 on a screen SC as a projection surface. The plurality of projectors 200 project images based on the image data supplied from the image supply apparatus 100. The screen SC is formed of a flat surface or a curtain and has an arbitrary specific shape. The projection surface may instead be a wall surface, a ceiling surface, a floor surface, or any other uniform surface and may include a curved surface and an irregular surface.

Apparatuses that can be employed as the image supply apparatus 100 can, for example, be a notebook personal computer (PC), a desktop PC, a tablet terminal, a smartphone, and a personal digital assistant (PDA). The image supply apparatus 100 may instead be a video reproduction apparatus, a digital versatile disk (DVD) player, a Blu-ray disk player, a hard disk recorder, a TV tuner, a set-top box of a cable television (CATV), a video game console, or any other apparatus. The image supply apparatus 100 corresponds to the "image processing apparatus" according to an aspect of the invention.

FIG. 1 shows four projectors, projectors 200A, 200B, 200C, and 200D, as the plurality of projectors 200, but the number of projectors 200 is not limited to four. In the following description, in a case where the projectors 200A, 200B, 200C, and 200D do not particularly need to be distinguished from one another, they are called the projectors 200.

FIG. 1 shows an arrangement example in which the projectors 200A, 200B, 200C, and 200D are arranged in front of the screen SC laterally in the horizontal direction of the screen SC. The arrangement of the projectors 200 is not limited to the arrangement shown in FIG. 1. For example, the four projectors 200 may be arranged in a matrix formed of two vertical columns and two horizontal rows, or the four projectors may be so arranged as to be stacked on each other in the vertical direction.

The projectors 200A to 200D project images in different areas of the screen SC. The area of the screen SC where the projector 200A projects an image is called a projection area 10A, and the area of the screen SC where the projector 200B projects an image is called a projection area 10B. Similarly, the area of the screen SC where the projector 200C projects an image is called a projection area 10C, and the area of the screen SC where the projector 200D projects an image is called a projection area 10D. The projection areas 10A to 10D are each an area of the screen SC where images drawn on liquid crystal panels 225A (see FIG. 3), which will be described later, are projected. The projection area 10A and the projection area 10B may partially overlap with each other. Similarly, the projection area 10B and the projection area 10C may partially overlap with each other, and the projection area 10C and the projection area 10D may partially overlap with each other. When part of an image projected by a projector 200 overlaps with part of an image projected by another projector 200, the visibility of the boundary between the images can be reduced.

The image supply apparatus 100 is connected to the projectors 200 in daisy chain connection.

The image supply apparatus 100 is connected to the projector 200A via a cable 21. The image supply apparatus 100 is a higher-level apparatus than the projector 200A in the daisy chain connection.

The projector 200A is connected to the projector 200B via a cable 22. The projector 200A is a higher-level apparatus than the projector 200B in the daisy chain connection. The projector 200A is a projector 200 having the first connection ranking in the daisy chain connection and acts as a master projector. The projector 200A acts as the "first display apparatus" and the "display apparatus" in aspects of the invention.

The projector 200B is connected to the projector 200C via a cable 23. The projector 200B is a higher-level apparatus than the projector 200C in the daisy chain connection. The projector 200B is a projector 200 having the second connection ranking in the daisy chain connection and acts as a slave projector. The projector 200B acts as the "second display apparatus" and the "external display apparatus" in aspects of the invention.

The projector 200C is connected to the projector 200D via a cable 24. The projector 200C is a higher-level apparatus than the projector 200D in the daisy chain connection. The projector 200C is a projector 200 having the third connection ranking in the daisy chain connection, and the projector 200D is a projector 200 having the fourth connection ranking in the daisy chain connection. The projectors 200C and 200D also each act as a slave projector and act as the "second display apparatus" in an aspect of the invention.

The image supply apparatus 100 and the projectors 200 each include an HDMI {registered trademark (High-Definition Multimedia Interface)} interface section and send and receive an HDMI signal. The interface is hereinafter abbreviated as I/F. The image supply apparatus 100 includes an HDMI I/F section 140 (see FIG. 2). The projector 200A includes an HDMI I/F section 210A, and the projector 200B includes an HDMI I/F section 210B. The projector 200C includes an HDMI I/F section 210C, and the projector 200D includes an HDMI I/F section 210D.

Figure 3:
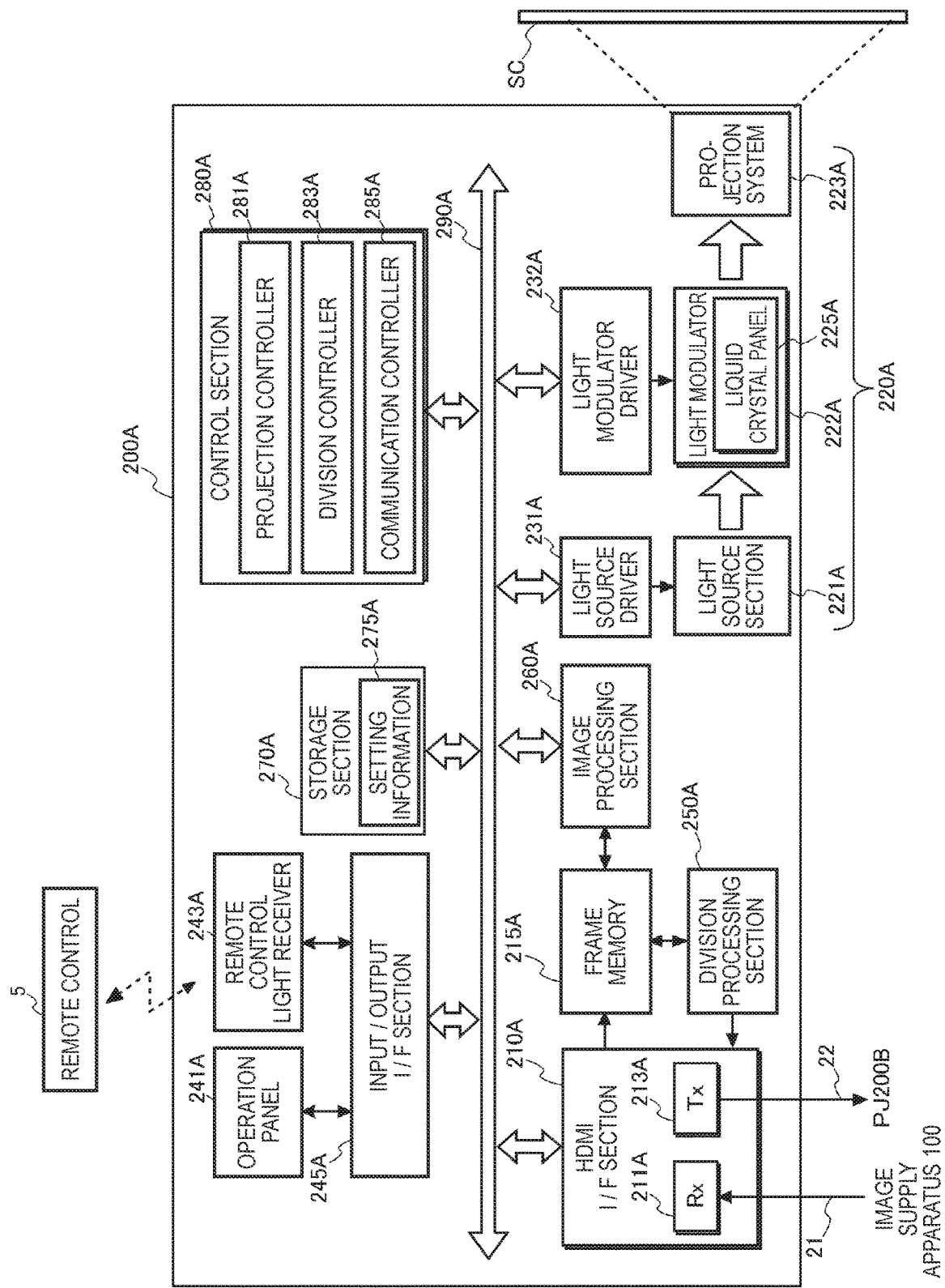
FIG. 3 is a configuration diagram showing the configuration of a projector.

The HDMI I/F sections 210 each include an image input section 211 and an image output section 213. The HDMI I/F section 210A includes an image input section 211A and an image output section 213A, and the HDMI I/F section 210B includes an image input section 211B and an image output section 213B. The image input section 211A corresponds to the "first input section" and the "input section" in aspects of the invention, and the image output section 213A corresponds to the "output section" in an aspect of the invention. The HDMI I/F section 210C includes an image input section 211C and an image output section 213C, and the HDMI I/F section 210D includes an image input section 211D and an image output section 213D. The image input sections 211B, 211C, and 211D correspond to the "second input section" in an aspect of the invention. In FIGS. 1 and 3, the image input sections 211 are each called "Rx," and the image output sections 213 are each called "Tx."

The present embodiment will be described with reference to a case where the apparatuses that form the display system 1 are connected to each other via the HDMI interfaces. The inter-apparatus connection interfaces are not limited to HDMI and may, for example, instead comply with any of the following interface standards.

For example, an interface that complies with any of the following standards can be used: Displayport; MHL (Mobile High-definition Link, registered trademark); HDBaseT (registered trademark); Thunderbolt (registered trademark); USB Type-C; 3G-SDI (Serial Digital Interface); and other standards.

The HDMI signal outputted by the image supply apparatus 100 to the projector 200A contains at least image data and may further contain voice data. The image data may be motion image data or still image data.

The projector 200A, which is the master projector, receives the HDMI signal from the image supply apparatus 100 and extracts the image data contained in the received HDMI signal. The image data received from the image supply apparatus 100 is hereinafter also referred to as source image data. The projector 200A produces partial frames each including at least part of the extracted source image data. In more detail, the projector 200A divides the image data received from the image supply apparatus 100 to produce the partial frames. The projector 200A sends the produced partial frames to the downstream projector 200B.

Figure 2:
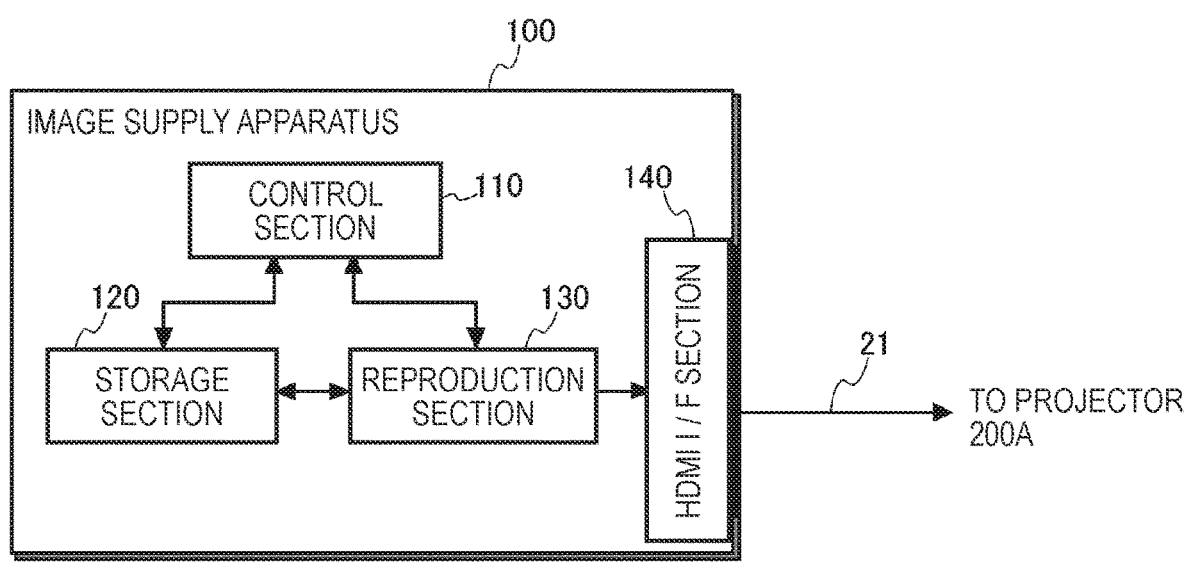
FIG. 2 is a configuration diagram showing the configuration of an image supply apparatus.

FIG. 2 is a configuration diagram showing the configuration of the image supply apparatus 100.

The image supply apparatus 100 includes a control section 110, a storage section 120, a reproduction section 130, and the HDMI I/F section 140.

The control section 110 includes a CPU (central processing unit), a ROM (read only memory), a RAM (random access memory), and other peripheral circuits (none of them is shown) as hardware and oversees and controls each of the sections of the image supply apparatus 100. The CPU is a processor that executes a computation process and executes the computation process in accordance with a control program stored in the ROM or the storage section 120. The ROM is a nonvolatile memory and stores, for example, the control program and computation data. The RAM is used as a work area that temporarily stores the control program executed by the processor and the computation data used by the processor.

The storage section 120 is an auxiliary storage device, for example a hard disk drive. The storage section 120 can be replaced with an SSD (solid state drive) or any other storage device using a semiconductor memory or a CD (compact disc), a DVD (digital versatile disc), a BD (Blu-ray (registered trademark) disc), or any other optical disk.

The storage section 120 stores the control program executed by the control section 110 and content data reproduced by the reproduction section 130. Examples of the content data include motion image data, still image data, voice data, and document files created with Word (registered trademark) and Excel (registered trademark).

The reproduction section 130 reproduces the content data stored in the storage section 120 under the control of the control section 110. Image data reproduced by the reproduction section 130 is outputted to the HDMI I/F section 140.

The HDMI I/F section 140 includes a connection terminal and an interface circuit (neither of them is shown) that support the HDMI interface. The cable 21 is connected to the connection terminal. The other end of the cable 21 is connected to the HDMI I/F section 210A (see FIG. 3) of the projector 200A.

The HDMI I/F section 140 converts the image data inputted from the reproduction section 130 into an HDMI signal (differential signal) in a predetermined format under the control of the control section 110. The HDMI I/F section 140 outputs the converted HDMI signal to the cable 21.

FIG. 3 is a configuration diagram showing the configuration of the projector 200A. The projectors 200A to 200D have roughly the same configurations, and the configuration of the projector 200A will therefore be described as a representative configuration. In the following description, the name of each component of the projector 200A has a suffix "A", and the name of each component of the projector 200B has a suffix "B". Similarly, the name of each component of the projector 200C has a suffix "C", and the name of each component of the projector 200D has a suffix "D". For example, a control section 280 of the projector 200A is called a "control section 280A," and a control section 280 of the projector 200B is called a "control section 280B." Similarly, a control section 280 of the projector 200C is called a "control section 280C," and a control section 280 of the projector 200D is called a "control section 280D."

The HDMI I/F section 210A of the projector 200A includes the image input section 211A and the image output section 213A.

The image input section 211A includes a connection terminal and an I/F circuit (neither of them is shown). The connection terminal is a terminal connected to the cable 21. The I/F circuit processes the HDMI signal received via the cable 21 to extract image data and sync signals from the HDMI signal. The image input section 211A outputs the extracted image data to a frame memory 215A and a division processing section 250A, which will be described later. The image input section 211A further outputs the acquired sync signals to the control section 280A, which will be described later. The control section 280A controls the division processing section 250A and the image output section 213A based on the inputted sync signals.

The image output section 213A includes a connection terminal and an I/F circuit. The connection terminal is a connection terminal connected to the cable 22. The I/F circuit converts the image data inputted from the image input section 211A or division processing section 250A into an HDMI signal and outputs the converted HDMI signal to the cable 22.

The frame memory 215A includes a plurality of banks. The banks each have storage capacity that allows one frame of image data (source image data) to be written. One frame of image data is image data that forms one screen, specifically, image data that forms one still image in the case of still image data and image data that forms one frame in the case of motion image data. The frame memory 215A is formed, for example, of an SDRAM (synchronous dynamic random access memory). An SDRAM is a DRAM that performs data reading and writing in synchronization with a clock.

The projector 200A includes a projection section 220A, which forms an optical image and projects the image on the screen SC. The projection section 220A of the projector 200A corresponds to the "first display section" in an aspect of the invention. Projection sections 220B to 220D of the projectors 200B to 200D correspond to the "second display section" in an aspect of the invention.

The projection section 220A includes a light source section 221A, a light modulator 222A, and a projection system 223A. The light source section 221A includes a light source formed, for example, of a xenon lamp, an ultrahigh-pressure mercury lamp, an LED (light emitting diode), or a laser light source. The light source section 221A may further include a reflector and an auxiliary reflector that guide light emitted by the light source to the light modulator 222A. The light source section 221A may further include a lens group for enhancing the optical characteristics of projected light, a polarizer, a light adjusting element that is disposed in the path leading to the light modulator 222A and attenuates the amount of the light emitted by the light source, or any other component (none of the components described above is shown).

The light source section 221A is driven by a light source driver 231A. The light source driver 231A is connected to a bus 290A and turns on and off the light source of the light source section 221A under the control of the control section 280A, which is also connected to the bus 290A.

The light modulator 222A includes three liquid crystal panels 225A corresponding, for example, to the three primary colors of light, R (red), G (green), and B (blue). That is, the light modulator 222A includes a liquid crystal panel 225A corresponding to the R (red) light, a liquid crystal panel 225A corresponding to the G (green) light, and a liquid crystal panel 225A corresponding to the B (blue) light. The light outputted by the light source section 221A is separated into RGB three color light fluxes and incident on the corresponding liquid crystal panels 225A. The three liquid crystal panels 225A are each a transmissive liquid crystal panel and include a drawing area where an image is drawn. When the three color light fluxes pass through the liquid crystal panels 225A, the images drawn in the drawing areas modulate the color light fluxes to produce image light fluxes. The modulated image light fluxes having passed through the liquid crystal panels 225A are combined with one another by a light combining system, such as a cross dichroic prism, and the combined light exits toward the projection system 223A.

The light modulator 222A is driven by a light modulator driver 232A. The light modulator driver 232A is connected to the bus 290A.

Image data corresponding to the RGB primary colors are inputted from an image processing section 260A to the light modulator driver 232A. The light modulator driver 232A converts the inputted image data into drive signals suitable for the action of the liquid crystal panels 225A. The light modulator driver 232A applies voltage to each pixel in the drawing areas of the liquid crystal panels 225A based on the converted drive signals to draw images on the liquid crystal panels 225A.

The projection system 223A includes a lens group that projects the modulated image light fluxes from the light modulator 222A onto the screen SC to form an image on the screen SC. The projection system 223A may further include a zoom mechanism that enlarges or reduces the image to be projected on the screen SC and a focus adjustment mechanism that adjusts focusing.

The projector 200A includes an operation panel 241A, a remote control light receiver 243A, and an input/output I/F section 245A.

The operation panel 241A, which functions as a user interface, is provided with a variety of operation keys and a liquid crystal panel. The input/output I/F section 245A is connected to the operation panel 241A, the remote control light receiver 243A and the bus 290A. The input/output I/F section 245A, when any of the operation keys thereof is operated, outputs an operation signal corresponding to the operated operation key to the control section 280A. The input/output I/F section 245A causes the liquid crystal panels to display a variety of operation screens under the control of the control section 280A. The operation screens each display a variety of buttons via which the projector 200A can be operated.

The remote control light receiver 243A, which is configured to receive an infrared signal, receives an infrared signal sent from a remote control 5, which functions as a user interface. The remote control light receiver 243A decodes the received infrared signal to produce an operation signal representing the content of the operation performed on the remote control 5 and outputs the operation signal to the control section 280A.

A storage section 270A is an auxiliary storage device, for example a hard disk drive. The storage section 270A can be replaced with a DRAM (dynamic RAM), a flash memory or a CD (compact disc), which is capable of storing large-capacity information, a DVD (digital versatile disc), a BD (Blu-ray disc), or any other optical disk. The storage section 270A stores a control program executed by the control section 280A and a variety of data used by the control section 280A.

The storage section 270A further stores setting information 275A. The setting information 275A contains information on the connection ranking in the daisy chain connection.

The information on the connection ranking corresponds to the "information on the number of frames" in an aspect of the invention.

The projector 200A includes an image processing system. The image processing system is primarily formed of the control section 280A, which oversees and controls the entire projector 200A. The image processing system further includes the frame memory 215A, the division processing section 250A, and the image processing section 260A. The control section 280A, the image processing section 260A, and the storage 270A are connected to each other via the bus 290A in a communicable manner.

The division processing section 250A divides the source image data received from the image supply apparatus 100 to produce a plurality of partial frames under the control of the control section 280A. The division processing section 250A corresponds to the "frame generation section" in an aspect of the invention. In the present embodiment, the display system 1 is formed of the four projectors 200A to 200D. The projector 200A therefore divides the image data into four to generate four partial frames. In a case where the number of projectors 200, which form the display system 1, is changed, the projector 200A generates partial frames the number of which corresponds to the changed number of projectors 200.

Further, in the present embodiment, in which the four projectors 200A to 200D are laterally arranged in a single row, the projector 200A divides the lateral size of the image data by four. For example, in a case where the resolution of image data is 1K in the vertical direction and 4K in the horizontal direction, the projector 200A divides the image data into four to generate four partial frames each having a resolution of 1K in the vertical direction and 1K in the horizontal direction. That is, the resolution of each of the partial frames is lower than the resolution of one frame of the source image data. The configuration of the division processing section 250A will be described later with reference to FIG. 4.

The image processing section 260A performs image processing on the image data developed in the frame memory 215A. Examples of the processing performed by the image processing section 260A include a resolution conversion process (scaling), a resizing process, a shape correction process, such as distortion correction, a digital zooming process, a color tone correction process, and a luminance correction process. The image processing section 260A executes a process specified by the control section 280A. The image processing section 260A executes the process by using a parameter inputted from the control section 280A as required. The image processing section 260A can, of course, execute the combination of a plurality of the processes described above. The image processing section 260A reads processed image data from the frame memory 215A and outputs the read image data to the light modulator driver 232A.

The control section 280A includes a CPU, a ROM, a RAM, and other peripheral circuits (none of them is shown) as hardware. The CPU is a processor that executes a computation process and executes the computation process in accordance with a control program stored in the ROM or the storage section 270A. The ROM is a nonvolatile memory and stores, for example, the control program and computation data. The RAM is used as a work area that temporarily stores the control program executed by the processor and the computation data used by the processor.

The control section 280A of the projector 200A corresponds to the "first display control section" in an aspect of the invention. The control sections 280B to 280D of the projectors 200B to 200D correspond to the "second display control section" in an aspect of the invention.

In the present embodiment, the control section 280A includes a single processor (CPU), and the processor executes processes according to the control program to achieve the functions of the control section 280A. A plurality of processors or semiconductor chips may instead achieve the functions of the control section 280A. For example, the control section 280A may further include a co-processor, such as a System-on-a-Chip (SoC), a micro control unit (MCU), and a field-programmable gate array (FPGA). The control section 280A may cause the CPU and the co-processor to cooperate with each other or may selectively use one of the CPU and the co-processor to perform a variety of types of control.

The control section 280A includes a projection controller 281A, a division controller 283A, and a communication controller 285A as functional blocks. The functional blocks represent, in the form of blocks for convenience, the functions achieved when the CPU performs computation in accordance with the control program but do not each stand for specific application software or hardware.

The projection controller 281A controls the portions that form the projector 200A to cause them to display an image on the screen SC. For example, the projection controller 281A controls the light modulator driver 232A to cause the liquid crystal panels 225A to draw images based on the image data. The projection controller 281A further controls the light source driver 231A to control turning-on/off of the light source of the light source section 221A and adjust the luminance of the light from the light source.

The division controller 283A controls the division processing section 250A and the image output section 213A to produce divided image data. The action of the division controller 283A will be described with reference to FIG. 4.

The communication controller 285A controls the HDMI I/F section 210A to communicate with the image supply apparatus 100 and the projector 200B.

Figure 4:
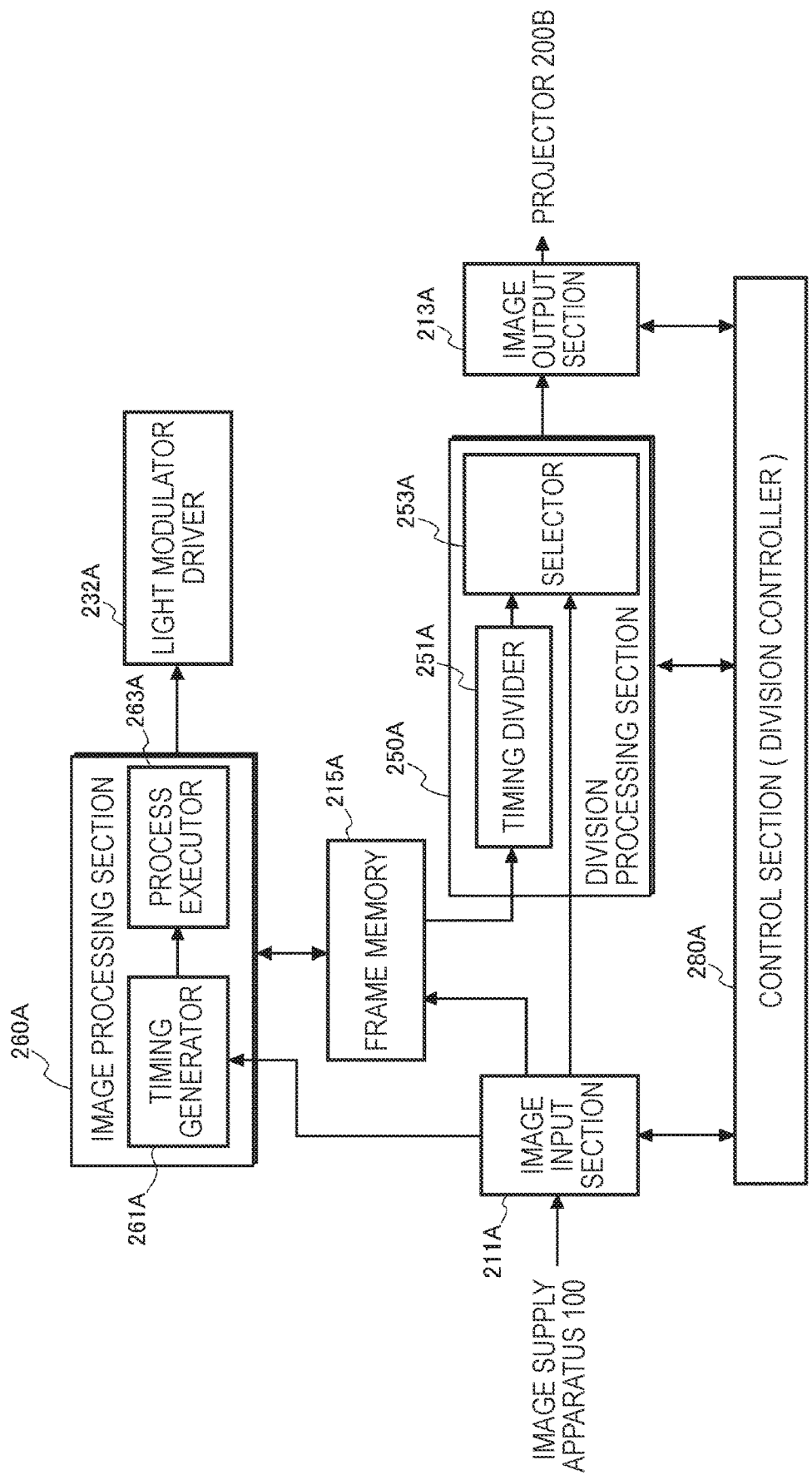
FIG. 4 is a configuration diagram showing the configuration of an image processing system.

FIG. 4 shows the configuration of the image processing system in detail.

The division processing section 250A includes a timing divider 251A and a selector 253A. The image processing section 260A includes a timing generator 261A and a process executor 263A. The image processing system acts differently in the case where the projector 200A acts as the master projector and in the case where the projector 200A acts as a slave projector. The action in the case where the projector 200A acts as the master projector will first be described.

The image input section 211A causes the frame memory 215A to store the entire received image data (source image data) under the control of the division controller 283A in the case where the projector 200A acts as the master projector.

The timing divider 251A reads the image data from the frame memory 215A and outputs the read image data to the selector 253A under the control of the division controller 283A. A readout signal is inputted from the division controller 283A to the timing divider 251A. The division controller 283A multiplies the frequency of the vertical sync signal contained in the HDMI signal received from the image supply apparatus 100 by four and outputs the readout signal that synchronizes with the converted vertical sync signal to the timing divider 251A. The reason why the frequency of the vertical sync signal is multiplied by four is to divide the source image data into four. For example, in a case where the number of projectors 200 that form the display system 1 is three, the frequency of the vertical sync signal is multiplied by three. The timing divider 251A reads the image data from the frame memory 215A in accordance with the inputted readout signal. The timing divider 251A outputs the read image data to the selector 253A.

Figure 5:
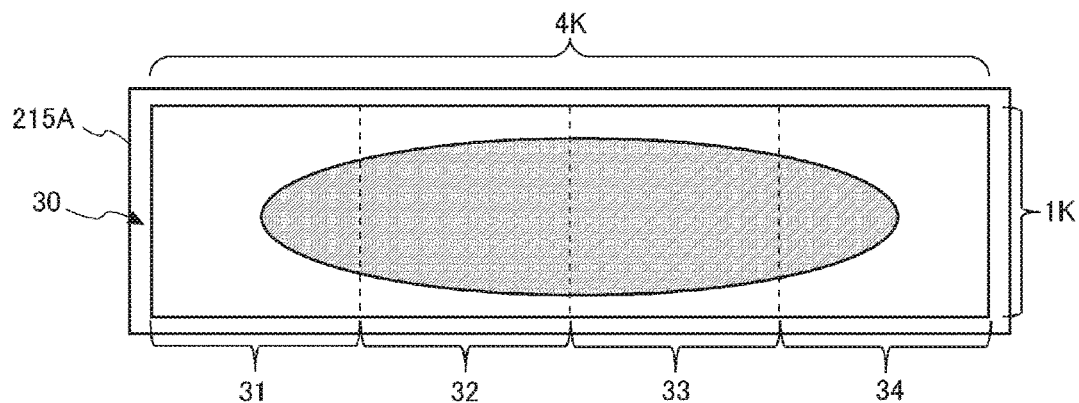
FIG. 5 shows a storage area of a frame memory.

FIG. 5 shows a storage area 30 of the frame memory 215A. The storage area 30 is an area formed of a storage device that stores image data. The action of the timing divider 251A will be described in more detail with reference to FIG. 5.

The description will be made on the assumption that image data having a one-frame data size of 1K in the vertical direction and 4K in the horizontal direction is developed in the storage area 30. The description will be made further on the assumption that the upper left storage pixel of the storage area 30 stores the upper left pixel of the source image data and the lower right storage pixel of the storage area 30 stores the lower right pixel of the source image data. The description will be made further on the assumption that the storage area 30 has four areas, a first storage area 31, a second storage area 32, a third storage area 33, and a fourth storage area 34 for convenience of the description. It is, however, noted that the storage area 30 is not divided into the four storage areas. The first to fourth storage areas 31 to 34 each correspond to the data size of the image data read by the timing divider 251A from the frame memory 215A when the readout signal is inputted to the timing divider 251A. The first storage area 31 to the fourth storage area 34 each have the size of 1K in the vertical direction and 1K in the horizontal direction, with the first storage area 31 located at the left end of the storage area 30 and the second storage area 32 located on the right of the first storage area 31. The third storage area 33 is located on the right of the second storage area 32, and the fourth storage area 34 is located on the right of the third storage area 33. That is, in the present embodiment, the timing divider 251A first reads the leftmost area of the four divided source image data, then reads the second area counted from the leftmost area, then reads the third area counted from the leftmost area, and finally reads the rightmost area.

The timing divider 251A reads (takes) image data of the predetermined size (1K in vertical direction and 1K in horizontal direction) from one frame of the source image data stored in the frame memory 215A to generate a plurality of partial frames.

The timing divider 251A reads the image data stored in the frame memory 215A in synchronization with the timing when the readout signal goes to a high signal level. When the readout signal goes to the high signal level for the first time, the timing divider 251A reads the image data stored in the first storage area 31 and outputs the read image data to the selector 253A. When the readout signal goes to the high signal level next time, the timing divider 251A reads the image data stored in the second storage area 32 and outputs the read image data to the selector 253A. The timing divider 251A thus successively reads the image data stored in the first to fourth storage areas 31 to 34 in synchronization with the timing when the readout signal goes to the high signal level. In the following description, the image data outputted from the timing divider 251A to the selector 253A is referred to as a partial frame. Out of one frame of the image data, the partial frame first outputted by the timing divider 251A to the selector 253A is referred to as a first partial frame, and the partial frame then outputted to the selector 253A is referred to as a second partial frame. The partial frame outputted after the second partial frame by the timing divider 251A to the selector 253A is referred to as a third partial frame, and the partial frame outputted after the third partial frame to the selector 253A is referred to as a fourth partial frame.

The timing divider 251A reads the image data from the frame memory 215A in the order of the first partial frame, the second partial frame, the third partial frame, and the fourth partial frame. The image output section 213A successively converts the image data in the partial frames inputted from the division processing section 250A into HDMI signals and outputs the image data in the partial frames to the cable 22 in the converted HDMI signal chronological order.

The image data in the first partial frame is the image data to be projected by the projector 200A on the projection area 10A, and the image data in the second partial frame is the image data to be projected by the projector 200B on the projection area 10B. The image data in the third partial frame is the image data to be projected by the projector 200C on the projection area 10C, and the image data in the fourth partial frame is the image data to be projected by the projector 200D on the projection area 10D.

That is, in the present embodiment, the image data in the partial frames are read from the frame memory 215A in the connection order in the daisy chain connection as an order set in advance.

The order in which the image data in the partial frames are read by the timing divider 251A from the frame memory 215A is not limited to the connection order in the daisy chain connection. For example, the image data in the partial frames may instead be read in the order of the fourth partial frame, the third partial frame, the second partial frame, and the first partial frame. In this case, the image output section 213A also outputs the image data in the partial frames to the projector 200B in the order of the fourth partial frame, the third partial frame, the second partial frame, and the first partial frame.

The selector 253A outputs the image data in the partial frames inputted from the timing divider 251A to the image output section 213A under the control of the division controller 283A.

The division controller 283A inputs the sync signals (vertical sync signal and horizontal sync signal) and an instruction signal that instructs the timing when a head frame packet 37 (see FIG. 7) is inserted to the image output section 213A. The image output section 213A adds the vertical sync signal to the head of the image data in each of the partial frames inputted from the selector 253A under the control of the division controller 283A. Further, the image output section 213A adds the head frame packet 37 to the image data in the first partial frame under the control of the division controller 283A. The image output section 213A converts the image data in the partial frames to which the sync signals and the head frame packet 37 have been added into HDMI signals and outputs the converted HDMI signals to the cable 22. The head frame packet 37 is a packet added to the first partial frame out of the four partial frames generated from image data (source image data) that forms one frame. The head frame packet 37 corresponds to the "identification data" in an aspect of the invention.

Figure 6:
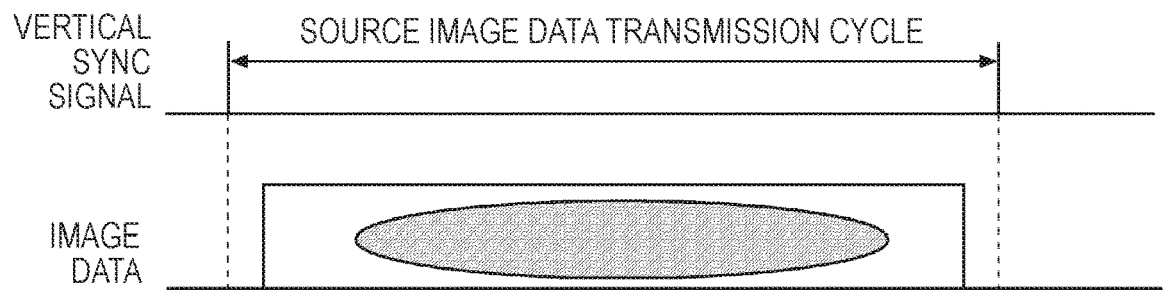
FIG. 6 shows one frame of image data.
Figure 7:
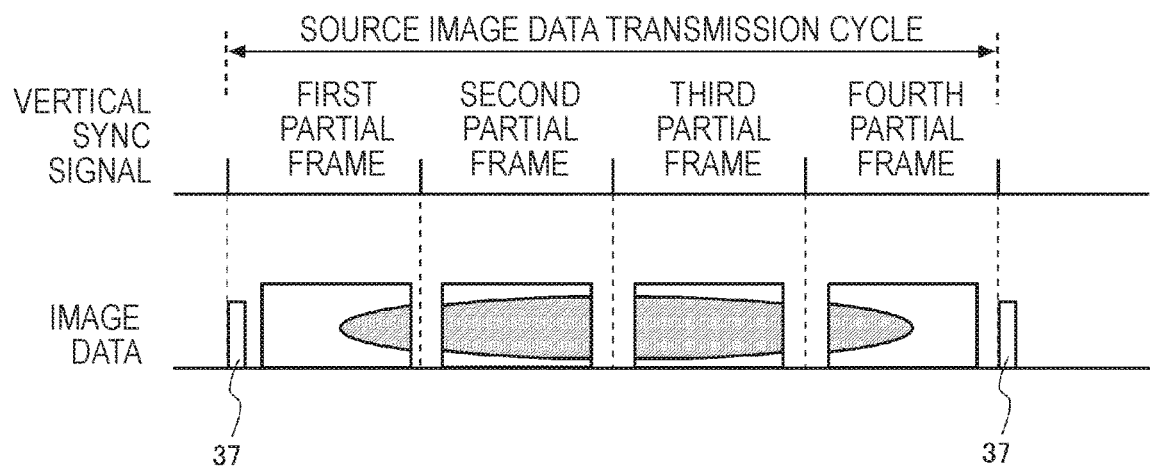
FIG. 7 shows partial frames into which the one frame of the image data is divided.

FIG. 6 shows the vertical sync signal and one frame of image data (source image data) contained in the HDMI signal received by the projector 200A from the image supply apparatus 100. FIG. 7 shows the vertical sync signal and image data in the partial frames contained in the HDMI signal outputted by the projector 200A to the projector 200B.

The division controller 283A controls the image output section 213A to cause it to add the vertical sync signal to the head of the image data in each of the partial frames. Specifically, the division controller 283A multiplies the frequency of the vertical sync signal received from the image supply apparatus 100 by four and instructs the timing when the image output section 213A adds the vertical sync signal based on the converted vertical sync signal. For example, in a case where the frequency of the vertical sync signal received from the image supply apparatus 100 is 30 Hz, the division controller 283A produces a signal representing 120 Hz, which is 30 Hz multiplied by 4. The division controller 283A instructs the timing when the image output section 213A adds the vertical sync signal based on the produced signal. Further, the division controller 283A controls the image output section 213A to cause it to add the head frame packet 37 to the head of the image data in the first partial frame based on the produced signal.

The image output section 213A outputs image data in the first to fourth partial frames generated from one frame of the source image to the cable 22 after the vertical sync signal is inputted from the image supply apparatus 100 but by the time when the following vertical sync signal is inputted therefrom. That is, the image output section 213A outputs the image data in the first to fourth partial frames, which have been generated from one frame of the source image, in a cycle corresponding to the cycle in which one frame of the source image data is transmitted.

The action of the image processing system in the case where the projector 200A acts as a slave projector will next be described. The action of the image processing system of each of the projectors 200B to 200D will be described by describing the action of the image processing system in the case where the projector 200A acts as a slave projector.

In the case where the projector 200A acts as a slave projector, an HDMI signal received by the image input section 211A contains image data in the partial frames.

The image input section 211A outputs the entire received image data in the first to fourth partial frames to the division processing section 250A, captures only the image data in the partial frame specified by the division controller 283A, and causes the frame memory 215A to store the captured image data.

A projector 200 that acts as a slave projector only needs to output the source image data received from the higher-level projector 200 (image data in first to fourth partial frames) to the downstream projector 200 without dividing or otherwise processing the source image data. The slave projector 200 captures only the image data in the partial frame to be projected by the slave projector 200 out of the image data in the first to fourth partial frames received from the higher-level projector 200 and causes the frame memory 215A to store the captured image data. The size of the image data on which the slave projector 200 performs image processing is the size of the image data in the four partial frames into which the source image data has been divided. The slave projector 200 therefore only needs to be capable of performing image processing on image data having the resolution of 1K in the vertical direction and 1K in the horizontal direction as the processing performance necessary for the image processing, whereby a low-processing-performance circuit configuration can be used in many portions of the processing circuit of the slave projector. A projector 200 having a simple circuit configuration can thus be achieved. A display system 1 in which the projectors 200, which form the display system 1, each have a simple circuit configuration, can be achieved with a delay of the period necessary for the overall display system 1 to display an image suppressed.

The division controller 283A determines based on the setting information 275A a partial frame in accordance with which the projector 200A projects an image. For example, in a case where the projector 200A has the third connection ranking set in the setting information 275A, the division controller 283A instructs the image input section 211A to cause the frame memory 215A to store the image data in the third partial frame. That is, the division controller 283A instructs the image input section 211A to cause the frame memory 215A to store the image data in the third partial frame inputted as the third frame after the image data in the first partial frame is inputted. In a case where the projector 200A has the fourth connection ranking set in the setting information 275A, the division controller 283A instructs the image input section 211A to cause the frame memory 215A to store the image data in the fourth partial frame.

The image input section 211A determines that the partial frame to which the head frame packet 37 has been added contains the image data in the first partial frame out of the image data in the received partial frames. The image input section 211A counts the number of vertical sync signals each added to the head of image data in a partial frame. For example, in a case where image data in a received partial frame contains the head frame packet 37 and the vertical sync signal, the image input section 211A clears the count of a counter to zero and increments the count by one. The image input section 211A thereafter increments the count of the counter by one whenever the image input section 211A receives a vertical sync signal. The image input section 211A evaluates which of the first to fourth partial frames is each of the received partial frames based on the count of the counter.

Assume that the image input section 211A has received from the division controller 283A an instruction of causing the frame memory 215A to store image data, for example, in the third partial frame. In a case where the result of the evaluation shows that image data in the received partial frames are the image data in the first, second, and fourth partial frames, the image input section 211A outputs the image data in these partial frames to the division processing section 250A. In a case where the result of the evaluation shows that image data in the received partial frame is the image data in the third partial frame, the image input section 211A captures the image data in the third partial frame, causes the frame memory 215A to store the captured image data, and outputs the image data to the division processing section 250A.

In the case where the projector 200A acts as a slave projector, the selector 253A outputs the image data in the partial frame inputted from the image input section 211A to the image output section 213A. The image output section 213A successively converts the image data in the inputted partial frame into an HDMI signal and outputs the HDMI signal to the cable 22 in the chronological order. The image output section 213A adds the vertical sync signal to the head of the image data in each partial frame, converts the image data in the partial frame to which the vertical sync signal has been added into an HDMI signal, and outputs the HDMI signal to the cable 22. That is, in the case where the projector 200A acts as a slave projector, the image data in a partial frame received from the higher-level projector 200 is sent with no change in the image data to the lower-level projector 200.

The timing generator 261A determines the projection timing when the projection section 220A projects the image data in the partial frame stored in the frame memory 215A. The action of the timing generator 261A will be described with reference to FIG. 8.

Figure 8:
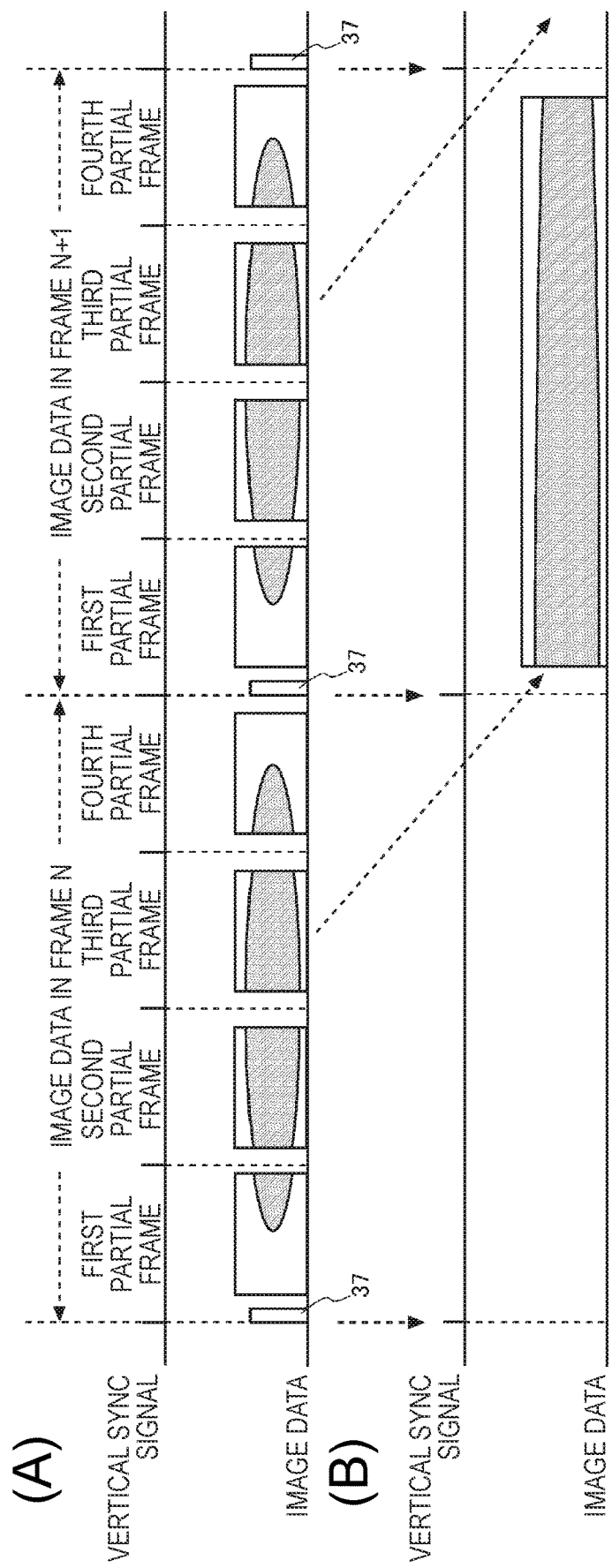
FIG. 8 shows the timing when a projector having the third connection ranking displays an image.

FIG. 8 shows the timing when the projector 200 having the third connection ranking displays image data. In particular, the portion (A) of FIG. 8 shows image data in partial frames received by the image input section 211A and corresponding to image data that forms two frames, a frame N (N is arbitrary natural number) and a frame N+1. The portion (B) of FIG. 8 shows the projection timing when the projection section 220A projects the image data in the frame N. The following description will be made on the assumption that the projector 200A has the third connection ranking.

When a notification signal is inputted from the image input section 211A, the timing generator 261A reads image data from the frame memory 215A and outputs the read image data to the process executor 263A. The frame memory 215A has stored image data in the third partial frame. The image data in the third partial frame is image data in one of the partial frames generated from the image data in the frame N shown in FIG. 8.

When the head frame packet 37 is inputted, the image input section 211A determines that image data in the first partial frame has been inputted. The image data in the first partial frame is image data in the first partial frame generated from the image data in the frame N+1, which is one frame after the frame N. Further, when the vertical sync signal added to the image data in the first partial frame is inputted, the image input section 211A outputs a notification signal to the timing generator 261A.

When the notification signal is inputted from the image input section 211A, the timing generator 261A reads the image data in the third partial frame from the frame memory 215A and outputs the read image data to the process executor 263A. The process executor 263A performs image processing on the image data inputted from the timing generator 261A and outputs the processed image data to the light modulator driver 232A.

Thereafter, the light modulator driver 232A converts the inputted image data into drive signals and draws images on the pixels of the liquid crystal panels 225A based on the converted drive signals. The light radiated by the light source section 221A passes through the liquid crystal panels 225A, which convert the light into image light, and the converted image light is projected by the projection system 223A on the projection area 10A of the screen SC.

The image drawn on each of the liquid crystal panels 225A is switched from one to another at the timing when the image processing section 260A outputs image data to the light modulator driver 232A. That is, the timing when the timing generator 261A reads image data in a partial frame from the frame memory 215A and outputs the image data to the process executor 263A is the timing when the image drawn on each of the liquid crystal panels 225A is changed. An image projected on the screen SC can therefore be switched in synchronization with the vertical sync signal contained in an HDMI signal supplied by the image supply apparatus 100.

The action of the timing generator 261A in the case where the projector 200A acts as the maser projector will next be described.

In the case where the projector 200A acts as the maser projector, the frame memory 215A stores image data that form one frame received from the image supply apparatus 100.

The timing generator 261A reads image data stored in the first storage area 31 out of the image data that form the one frame (that is, image data in first partial frame) and outputs the read image data to the process executor 263A.

The timing generator 261A starts reading the image data from the frame memory 215A at the timing when the image output section 213A completes sending of the image data in the first partial frame to the projector 200B.

Figure 9:
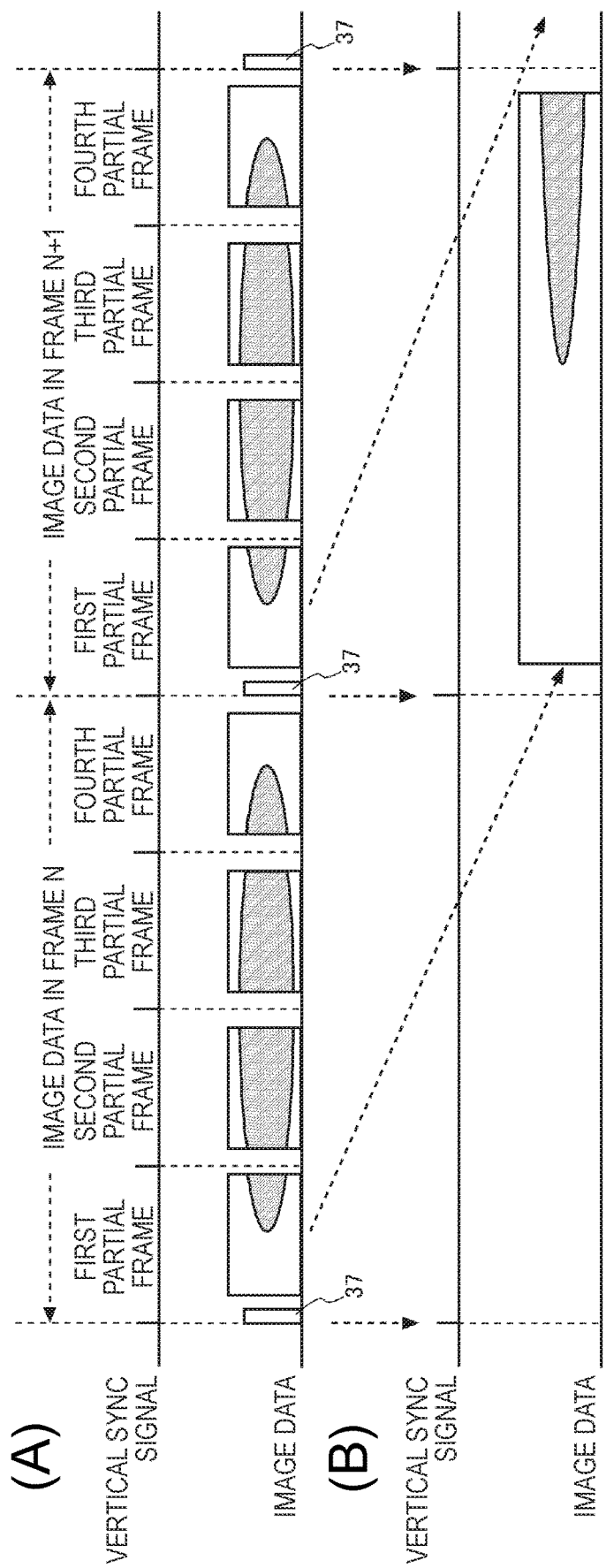
FIG. 9 shows the timing when a projector having the first connection ranking displays an image.

FIG. 9 shows the timing when the projector 200A having the first connection ranking displays an image. The portion (A) of FIG. 9 shows image data in partial frames received by the image input section 211A and corresponding to image data that forms the two frames, the frame N and the frame N+1. The portion (B) of FIG. 9 shows the timing when the image data in the frame N is displayed.

The timing generator 261A reads the image data in the first partial frame from the frame memory 215A at the timing when the image output section 213A completes sending of the image data in the first partial frame and causes the process executor 263A to perform image processing on the read image data. The image data in the first partial frame processed by the process executor 263A is outputted to the projection section 220A, and the projection section 220A projects an image based on the image data in the first partial frame. The image data in the first partial frame sent by the image output section 213A to the projector 200B are image data in the partial frames into which the image data in the frame N+1 has been divided. The image data in the first partial frame read by the timing generator 261A from the frame memory 215A is image data in the first partial frame to which the image data in the frame N, which the frame one frame before the frame N+1.

Figure 10:
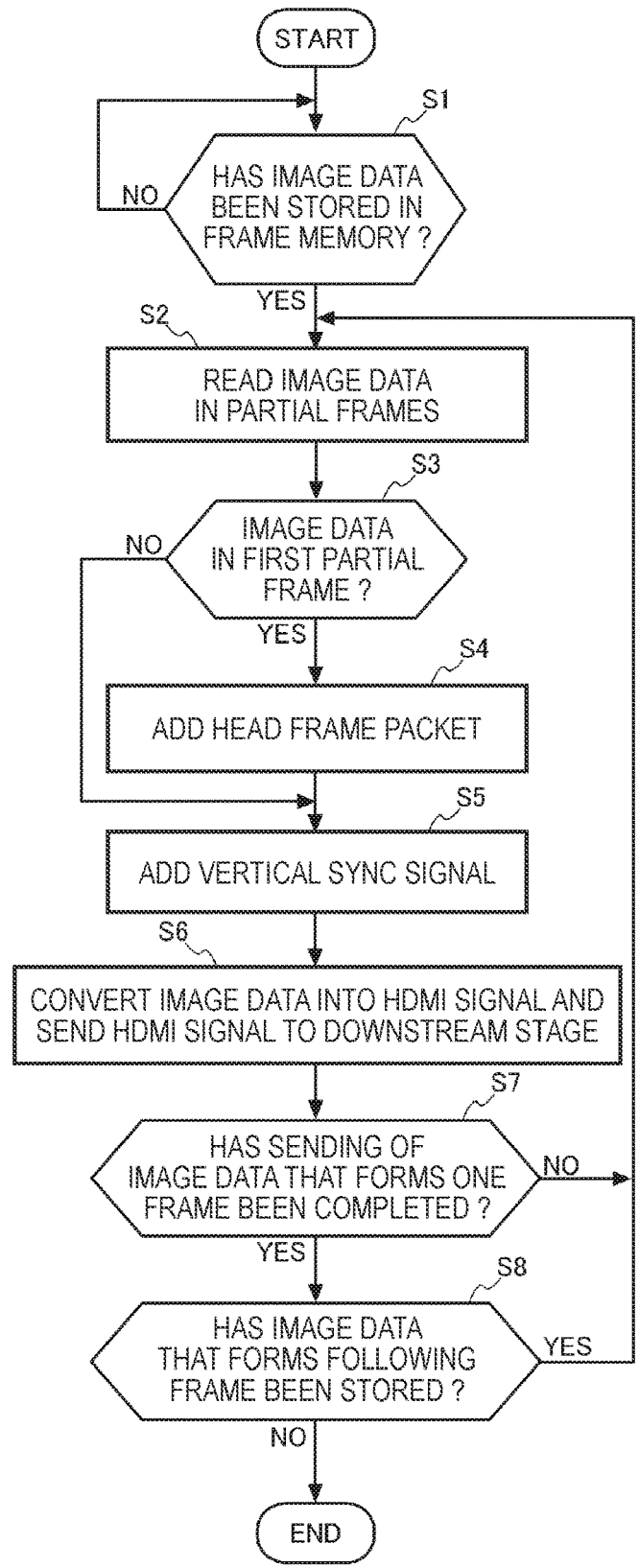
FIG. 10 is a flowchart showing the action of a projector that acts as a master projector.

FIG. 10 is a flowchart showing the action of the projector 200A that acts as the master projector, particularly, the action of dividing one frame of image data into image data in partial frames and outputting the divided image data to the projector 200B.

The division controller 283A first evaluates whether or not image data that forms one frame has been stored in the frame memory 215A (step S1). In a case where the result of the evaluation shows that no image data that forms one frame has been stored in the frame memory 215A (step S1/NO), the division controller 283A does not start executing the process that follows but waits until image data that forms one frame is developed in the frame memory 215A.

In a case where the result of the evaluation shows that image data that forms one frame has been stored in the frame memory 215A (step S1/YES), the division controller 283A outputs a readout signal to the division processing section 250A to cause the division processing section 250A to start reading the image data.

The division processing section 250A reads the image data in the partial frames from the frame memory 215A in synchronization with the readout signal inputted from the division controller 283A (step S2) and outputs the read image data to the image output section 213A.

In a case where the image data inputted to the image output section 213A is image data in the first partial frame (step S3/YES), the division controller 283A causes the image output section 213A to add the head frame packet 37. The image output section 213A adds the head frame packet 37 to the image data in the first partial frame under the control of the division controller 283A (step S4). In a case where the image data inputted to the image output section 213A is not image data in the first partial frame (step S3/NO), the division controller 283A proceeds to the process in step S5.

The division controller 283A then instructs in step S5 the image output section 213A to add the vertical sync signal.

The image output section 213A adds the vertical sync signal to the head of the partial image data under the control of the division controller 283A (step S5).

The image output section 213A then converts the image data in the partial frame to which the vertical sync signal or the head frame packet 37 and the vertical sync signal have been added into an HDMI signal and sends the converted HDMI signal to the projector 200B (step S6).

The division controller 283A then evaluates whether or not sending of the image data that forms the one frame has been completed (step S7). In a case where the sending of the image data that forms the one frame has not been completed (step S7/NO), the division controller 283A returns to the process in step S2 and keeps reading the image data in the partial frames. In the case where the sending of the image data that forms the one frame has been completed (step S7/YES), the division controller 283A evaluates whether or not image data that forms the following frame have been stored in the frame memory 215A (step S8). In a case where the image data that forms the following frame has not been stored (step S8/NO), the division controller 283A terminates the process procedure. In a case where the image data that form the following frame has been stored (step S8/YES), the division controller 283A returns to the process in step S2 and reads image data in the partial frames.

Figure 11:
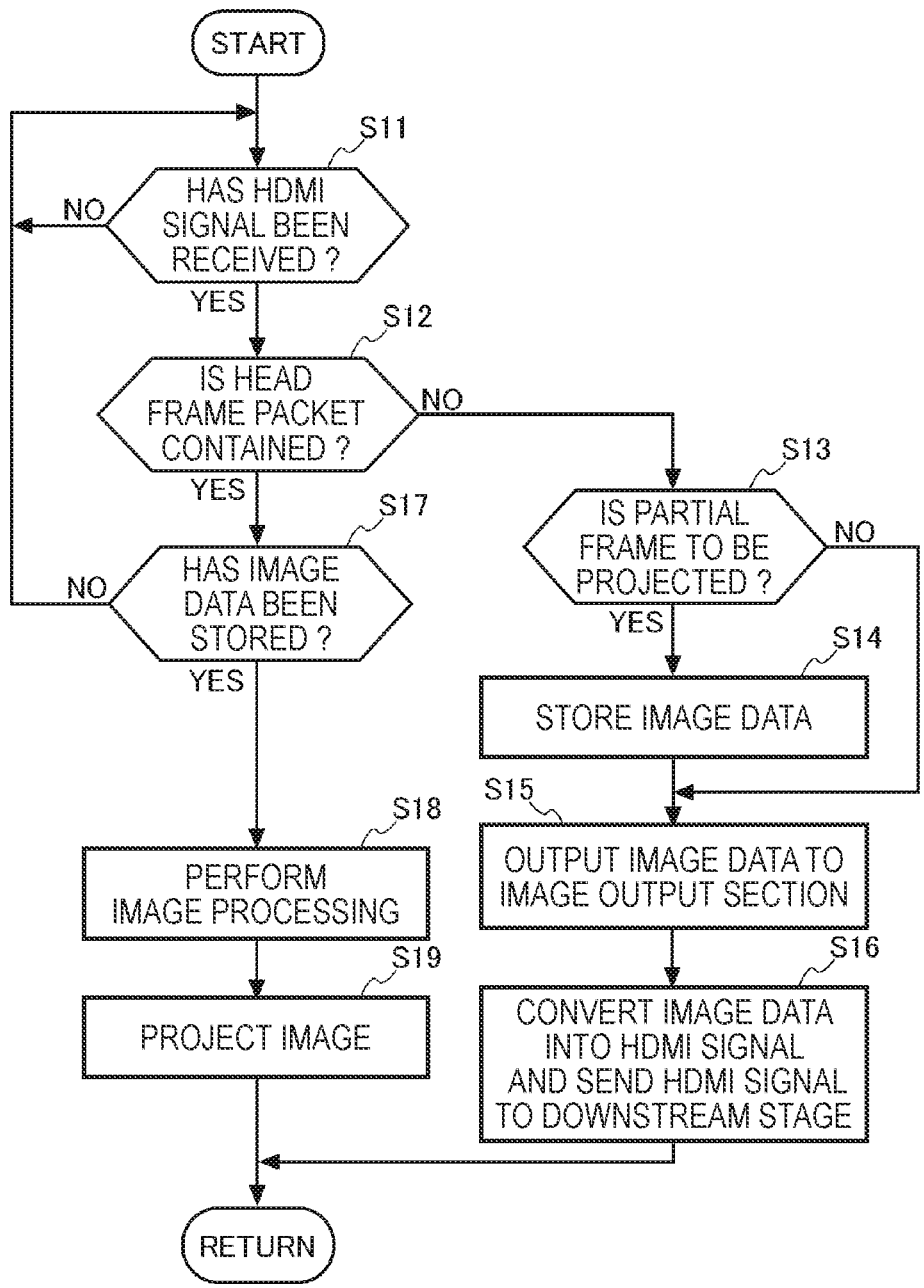
FIG. 11 is a flowchart showing the action of a projector that acts as a slave projector.

FIG. 11 is a flowchart showing the action of a projector 200 that acts as a slave projector. The following description will be made of the action of the projector 200B as a slave projector.

The control section 280B evaluates whether or not the image input section 211B has received an HDMI signal. In a case where no HDMI signal has been received (step S11/NO), the control section 280B does not start executing the process that follows but waits until an HDMI signal has been received.

In a case where the image input section 211B has received an HDMI signal (step S11/YES), the control section 280B extracts image data in the partial frames contained in the received HDMI signal. The control section 280B evaluates whether or not the head frame packet 37 is contained in the extracted image data in the partial frames (step S12).

In a case where no head frame packet 37 is contained (step S12/NO), the image input section 211B increments the count of the counter, which counts the number of vertical sync signals, by one. The image input section 211B evaluates whether or not the incremented count of the counter has reached a count specified by the division controller 283B. The image input section 211B thus evaluates whether or not the image data in the received partial frame belongs to the partial frame to be projected by the projector 200B on the screen SC (step S13). In a case where the result of the evaluation shows that the image data in the received partial frame belongs to the partial frame to be projected (step S13/YES), the image input section 211B causes the frame memory 215B to store the image data in the received partial frame (step S14). The image input section 211B outputs the image data in the received partial frame to the selector 253B of the division processing section 250B. The selector 253B outputs the image data in the inputted partial frame to the image output section 213B (step S15). The image output section 213B sends the image data in the inputted partial frame to the projector 200C via the cable 23 (step S16).

In a case where the result of the evaluation shows that the image data in the received partial frame is not image data in the partial frame to be projected (step S13/NO), the image input section 211B outputs the image data in the partial frame to the selector 253B of the division processing section 250B. The selector 253B outputs the image data in the inputted partial frame to the image output section 213B (step S15). The image output section 213B sends the image data in the inputted partial frame to the projector 200C via the cable 23 (step S16).

In the evaluation in step S12, in a case where the head frame packet 37 is contained in the image data in the received partial frame (step S12/YES), the image input section 211B determines that the image data in the received partial frame belongs to the first partial frame. In this case, the image input section 211B outputs a notification signal to the timing generator 261B at the timing when the image input section 211B receives the vertical sync signal added to the image data in the first partial frame.

The timing generator 261B, when the notification signal is inputted to the timing generator 261B from the image input section 211B, evaluates whether or not image data in the second partial frame has been stored in the frame memory 215B (step S17). In a case where the result of the evaluation shows that image data in the second partial frame has not been stored in the frame memory 215B (step S17/NO), the timing generator 261B returns to step S11 and keeps receiving HDMI signals. In a case where image data in the second partial frame has been stored in the frame memory 215B (step S17/YES), the timing generator 261B reads the image data in the second partial frame from the frame memory 215B and outputs the read image data to the process executor 263B.

The process executor 263B performs image processing on the image data in the second partial frame inputted from the timing generator 261B (step S18) and outputs the image data having undergone the image processing to the light modulator driver 232B. The light modulator driver 232B then converts the inputted image data into drive signals and draws images on the liquid crystal panels 225B based on the converted drive signals. The light outputted from the light source section 221B and separated into RGB three color light fluxes passes through the liquid crystal panels 225B, which converts the color light fluxes into image light fluxes, and the converted image light fluxes are projected by the projection system 223B on the projection area 10B of the screen SC (step S19).

As described above, the display system 1 according to the present embodiment includes the projector 200A as the master projector and the projectors 200B as the slave projectors.

The projector 200A includes the projection section 220A, the image input section 211A, the division processing section 250A, the image output section 213A, and the control section 280A.

The projection section 220A projects an image. Source image data is inputted to the image input section 211A. The division processing section 250A generates a plurality of partial frames each containing at least part of a frame of the source image data. The image output section 213A outputs the plurality of partial frames generated by the division processing section 250A to the projector 200B in an order set in advance. The control section 280A causes the projection section 220A to project one of the generated partial frames.

The projector 200B includes the projection section 220B, the image input section 211B, and the control section 280B. The projection section 220B projects an image. The partial frames are inputted from the projector 200A to the image input section 211B. The control section 280B selects a partial frame to be projected by the projection section 220B based on the input order of the partial frames inputted to the image input section 211B and causes the projection section 220B to project the selected partial frame.

According to the configuration described above, since the projector 200A generates a plurality of partial frames and sends the partial frames to the projector 200B, the projector 200B does not need to generate partial frames. A low-processing-performance circuit configuration can therefore be used in many portions of the processing circuit of the projector 200B. A projector 200B having a simple circuit configuration can thus be achieved.

The projector 200A sends the partial frames in the order set in advance, and the projector 200B selects, based on the input order of the partial frames inputted to the image input section 211B, a partial frame to be displayed. The partial frame to be displayed by the projector 200B can therefore be selected from the plurality of partial frames received from the projector 200A.

The projectors 200B to 200D are connected to the projector 200A in the daisy chain connection.

Therefore, in the configuration in which the projectors 200A to 200D are daisy-chained to each other, the projector 200B to 200D can each select a partial frame to be displayed from the plurality of received partial frames.

The division processing section 250A takes a plurality of partial frames from one frame that forms a source image to generate the plurality of partial frames. The image output section 213A continuously outputs the plurality of partial frames generated from one frame of the source image data.

The projectors 200A to 200D can therefore display the plurality of partial frames generated from one frame that forms the source image data.

The image output section 213A adds the head frame packet 37 to the partial frame that is first outputted to the projector 200B out of the plurality of partial frames generated from one frame of the source image data and outputs the partial frame with the head frame packet 37.

The projectors 200B to 200D can therefore determine the head partial frame out of the plurality of inputted partial frames.

The storage sections 270B to 270D of the projectors 200B to 200D store information on the number of frames after the head partial frame is inputted to the image input sections 211B to 211D but by the time when the partial frames to be displayed by the projection sections 220B to 220D are inputted.

The control sections 280B to 280D of the projectors 200B to 200D count the number of partial frames after the partial frame to which the head frame packet 37 has been added is inputted to the image input sections 211B to 211D. When the count coincides with the information on the number of frames stored in the storage sections 270B to 270D, the control sections 280B to 280D select the partial frames inputted to the image input sections 211B to 211D as the partial frames to be displayed by the projection sections 220B to 220D.

The amount of information notified from the projector 200A to the projectors 200B to 200D is therefore be reduced, and the small amount of information allows the projectors 200B to 200D to each select a partial frame to be displayed from the plurality of received partial frames.

The image output section 213A adds the vertical sync signal to the head of each of the plurality of partial frames generated from one frame of the source image data.

The control sections 280B to 280D cause the projection sections 220B to 220D to project the selected partial frames in synchronization with the timings when the vertical sync signals added to the partial frames are inputted to the image input sections 211B to 211D.

The easy, simple circuit configuration described above therefore allows the timings when the projectors 200A to 200D display the partial frames generated from one frame of the source image data to synchronize with one another.

The division processing section 250A generates partial frames the number of which corresponds to the projectors 200A to 200D from one frame of the source image data.

One frame of the source image can therefore be divided and displayed by the projectors 200A to 200D.

The image output section 213A outputs the plurality of partial frames generated from one frame of the source image data in the cycle corresponding to the cycle in which the one frame of the source image data is transmitted.

The plurality of partial frames can therefore be transmitted to each of the projectors 200B to 200D in the cycle in which the one frame of the source image is transmitted.

The division processing section 250A generates partial frames each having resolution lower than the resolution of one frame that forms the source image data. The source image data can therefore be divided into a plurality of partial frames each having resolution lower than that of the source image.

The image output section 213A outputs the plurality of partial frames in the chronological order in accordance with the connection ranking in the daisy chain connection.

The projectors 200B to 200D can therefore select the partial frames to be displayed by the projectors 200B to 200D from the plurality of partial frames received from the higher-level projector 200A in accordance with the connection ranking in the daisy chain connection.

The embodiment described above is a preferable form of the invention. The invention is, however, not limited to the embodiment described above, and a variety of changes can be made thereto to the extent that the changes do not depart from the substance of the invention.

For example, in the embodiment described above, the projector 200A acts as the "first display apparatus." Instead, the image supply apparatus 100 may act as the "first display apparatus" and generate image data formed of partial frames. In this case, the four projectors 200A to 200D all act as the "second display apparatus" or "display apparatus" in an aspect of the invention.

The configuration of the image supply apparatus 100 in the case where the image supply apparatus 100 acts as the image processing apparatus is roughly the same as the configuration of the projector 200A shown in FIG. 4 and will therefore not be described in detail with reference to the drawings. In the case where the image supply apparatus 100 acts as the "image processing apparatus," the HDMI I/F section 140 is provided with the image input section 211 and the image output section 213 shown in FIG. 4. The image input section 211 of the HDMI I/F section 140 acts as a functional portion that reads image data from the storage section 120 shown in FIG. 2. The image output section 213 of the HDMI I/F section 140 adds the head frame packet 37 and/or the vertical sync signal to image data in a partial frame under the control of the control section 110. The image output section 213 of the HDMI I/F section 140 converts the image data in the partial frame to which the head frame packet 37 and/or the vertical sync signal have been added into an HDMI signal and outputs the HDMI signal to the cable 21.

In the embodiment described above, out of the four partial frames generated from image data (source image data) that forms one frame, the head frame packet 37 is added to the first partial frame. As another example, the head frame packet 37 may be added to the head of any of the second to fourth partial frames. When the projectors 200B to 200D are configured in advance to recognize the position where the head frame packet 37 is added, the projectors 200B to 200D can each determine which of the first to fourth partial frames is a received partial frame based on the head frame packet 37.

The timing when the projectors 200A to 200D each project an image is not limited to the timing when the projector receives the vertical sync signal added to image data in the first partial frame. For example, the image projection timing may synchronize with the vertical sync signal added to any of the second to fourth partial frames.

In the embodiment described above, the configuration in which the light modulator 222A includes the liquid crystal panels 225A has been presented by way of example. The liquid crystal panels 225A may each be a transmissive liquid crystal panel or a reflective liquid crystal panel. The light modulator 222A may be formed of digital mirror devices (DMDs) in place of the liquid crystal panels 225A. The light modulator 222A may still instead be the combination of digital mirror devices and a color wheel. The light modulator 222A may still instead employ a configuration in which light emitted from a light source can be modulated without use of liquid crystal panels or DMDs.

Each of the functional portions of the projector 200A shown in FIG. 3 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions of the projector can be arbitrarily changed to the extent that the change does not depart from the substance of the invention.

The process units in the flowcharts shown in FIGS. 10 and 11 are process units divided in accordance with the contents of the primary processes for ease of understanding of the processes executed by the projectors 200, and how to produce the divided process units or the names of the process units shown the flowcharts of FIGS. 10 and 11 do not limit the embodiment of the invention. A process executed by the control section 280 can be further divided into a larger number of process units in accordance with the content of the process, and each of the process units can further be divided into a large number of processes. Further, the orders in which the processes are executed in the flowcharts described above is not limited to the orders shown in FIGS. 10 and 11.

The entire disclosure of Japanese Patent Application No. 2017-228721, filed Nov. 29, 2017 is expressly incorporated by reference herein.

What is claimed is:

1. A display system comprising:
a first display apparatus; and
a second display apparatus,
wherein the first display apparatus includes
a first display section that displays an image,
a first input section to which a source image is inputted,
a frame generation section that generates a plurality of partial frames each containing at least part of a frame of the source image,
an output section that outputs the plurality of partial frames generated by the frame generation section to the second display apparatus in an order set in advance, and
a first display control section that causes the first display section to display any of the partial frames generated by the frame generation section, and
the second display apparatus includes
a second display section that displays an image,
a second input section to which the partial frames are inputted from the first display apparatus, and
a second display control section that selects one of the partial frames to be displayed by the second display section based on an input order of the partial frames inputted to the second input section and causes the second display section to display the selected partial frame, and
wherein a plurality of the second display apparatuses are connected to the first display apparatus in daisy chain connection,
the frame generation section takes the plurality of partial frames from one frame that forms the source image to generate the plurality of partial frames, and
the output section continuously outputs the plurality of partial frames generated from the one frame of the source image.

2. The display system according to claim 1, wherein the output section adds identification data to a head of any of the plurality of partial frames generated from the one frame of the source image and outputs the partial frame with the identification data.

3. The display system according to claim 2,
wherein the second display apparatuses each include a storage section that stores information on the number of frames after the head partial frame is inputted to the second input section but by the time when the partial frame to be displayed by the second display section is inputted, and
the second display control section counts the number of partial frames inputted to the second input section after the partial frame to which the identification data has been added is inputted to the second input section, and when the count coincides with the information on the number of frames stored in the storage section, the second display control section selects the partial frame inputted to the second input section as the partial frame to be displayed by the second display section.

4. The display system according to claim 1,
wherein the output section adds a vertical sync signal to the head of each of the plurality of partial frames generated from the one frame of the source image, and
the second display control sections cause the second display sections to display the selected partial frames in synchronization with timings when the vertical sync signals added to the partial frames are inputted to the second input sections.

5. The display system according to claim 1, wherein the frame generation section generates the partial frames, the number of which corresponds to the first display apparatus and the plurality of second display apparatuses, from the one frame of the source image.

6. The display system according to claim 1, wherein the output section outputs the plurality of partial frames generated from the one frame of the source image in a cycle corresponding to a cycle in which the one frame of the source image is transmitted.

7. The display system according to claim 1, wherein the frame generation section generates the partial frames each having resolution lower than resolution of the one frame that forms the source image.

8. The display system according to claim 1, wherein the output section outputs the plurality of partial frames in a chronological order in accordance with connection ranking in daisy chain connection.

9. An image processing apparatus connected to an external display apparatus, the image processing apparatus comprising:
   a frame generation section that takes a partial frame from one frame that forms a source image in such a way that the partial frame contains at least part of the one frame of the source image to generate a plurality of the partial frames; and
   an output section that outputs the plurality of partial frames generated by the frame generation section from the one frame of the source image to the external display apparatus in an order set in advance,
   wherein the frame generation section takes the plurality of partial frames from one frame that forms the source image to generate the plurality of partial frames, and
   the output section continuously outputs the plurality of partial frames generated from the one frame of the source image.

10. A display method for displaying a source image by a plurality of display apparatuses connected to each other in daisy chain connection, the method comprising:
   generating a plurality of partial frames from one frame of the source image in such a way that the partial frames each contain at least part of the one frame of the source image;
   transmitting the plurality of partial frames generated from the one frame of the source image in an order set in advance to the plurality of display apparatuses; and
   causing the plurality of display apparatuses to each select one of the partial frames to be displayed by the display apparatus based on an input order of the plurality of partial frames generated from the one frame of the source image and display the selected partial frames,
   wherein
      generating the plurality of partial frames includes taking the plurality of partial frames from one frame that forms the source image to generate the plurality of partial frames, and
      transmitting the plurality of partial frames includes continuously outputting the plurality of partial frames generated from the one frame of the source image.

* * * * *